(12) United States Patent
Chu et al.

(10) Patent No.: US 12,160,826 B1
(45) Date of Patent: *Dec. 3, 2024

(54) WLAN PACKET WITH NEIGHBOR WAKEUP RADIO INFORMATION

(71) Applicant: MARVELL ASIA PTE LTD, Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,076

(22) Filed: Jan. 26, 2023

Related U.S. Application Data

(63) Continuation of application No. 17/140,714, filed on Jan. 4, 2021, now Pat. No. 11,576,125, which is a
(Continued)

(51) Int. Cl.
| | |
|---|---|
| *H04W 52/02* | (2009.01) |
| *H04B 17/318* | (2015.01) |
| *H04W 48/16* | (2009.01) |
| *H04W 76/11* | (2018.01) |
| *H04W 80/02* | (2009.01) |
| *H04W 84/12* | (2009.01) |

(52) U.S. Cl.
CPC ...... *H04W 52/0229* (2013.01); *H04B 17/318* (2015.01); *H04W 48/16* (2013.01); *H04W 76/11* (2018.02); *H04W 80/02* (2013.01); *H04W 84/12* (2013.01)

(58) Field of Classification Search
CPC . H04W 52/0229; H04W 76/11; H04W 48/16; H04W 80/02; H04W 84/12; H04B 17/318
See application file for complete search history.

(56) References Cited

U.S. PATENT DOCUMENTS

| | | |
|---|---|---|
| 10,887,837 B1 | 1/2021 | Chu et al. |
| 11,076,353 B2 | 7/2021 | Wang et al. |

(Continued)

FOREIGN PATENT DOCUMENTS

| | | |
|---|---|---|
| CN | 107800526 A | 3/2018 |
| WO | 2018032774 A1 | 2/2018 |

OTHER PUBLICATIONS

Park et al., "Proposal for Wake-Up Receiver (WUR) Study Group," IEEE Draft 802.11-16/0722r1, 14 pages (May 18, 2016).

*Primary Examiner* — Duc C Ho

(57) ABSTRACT

A first communication device for communicating in a wireless local area network (WLAN) includes a WLAN network interface device and a wakeup radio (WUR) coupled to the WLAN network interface device. The WLAN network interface device is configured to receive, from a second communication device, a WLAN packet that includes a WUR identifier for a third communication device. The WUR of the first communication device is configured to receive a WUR packet that includes the WUR identifier. At least one of the WLAN network interface and the WUR are further configured to use the WUR packet to determine whether to change a WLAN association from the second communication device to the third communication device.

25 Claims, 12 Drawing Sheets

900

GENERATE A WLAN PACKET TO INCLUDE A WUR IDENTIFIER ASSOCIATED WITH A NEIGHBOR COMMUNICATION DEVICE — 902

TRANSMIT THE WLAN PACKET TO WLAN NETWORK INTERFACE DEVICE OF SECOND COMMUNICATION DEVICE — 904

Related U.S. Application Data continuation of application No. 16/161,961, filed on Oct. 16, 2018, now Pat. No. 10,887,837.

(60) Provisional application No. 62/623,410, filed on Jan. 29, 2018.

(56) References Cited

U.S. PATENT DOCUMENTS

| | | |
|---|---|---|
| 11,576,125 B1 | 2/2023 | Chu et al. |
| 2014/0112225 A1 | 4/2014 | Jafarian et al. |
| 2015/0208349 A1 | 7/2015 | Ramamurthy et al. |
| 2016/0366644 A1 | 12/2016 | Ghosh et al. |
| 2016/0374020 A1 | 12/2016 | Azizi et al. |
| 2017/0111858 A1 | 4/2017 | Azizi et al. |
| 2018/0019902 A1 | 1/2018 | Suh et al. |
| 2018/0020405 A1 | 1/2018 | Huang et al. |
| 2018/0092036 A1 | 3/2018 | Azizi et al. |
| 2018/0184379 A1 | 6/2018 | Liu et al. |
| 2018/0184435 A1* | 6/2018 | Cariou .............. H04W 52/0203 |
| 2018/0206192 A1 | 7/2018 | Vermani et al. |
| 2018/0234921 A1 | 8/2018 | Huang et al. |
| 2018/0242249 A1 | 8/2018 | Yang et al. |
| 2018/0376419 A1 | 12/2018 | Li et al. |
| 2019/0014612 A1 | 1/2019 | Lee |
| 2019/0069239 A1* | 2/2019 | Li .......................... H04W 4/06 |
| 2019/0075521 A1 | 3/2019 | Kneckt et al. |
| 2019/0200295 A1 | 6/2019 | Hartman et al. |
| 2019/0223101 A1 | 7/2019 | Li et al. |
| 2019/0261273 A1 | 8/2019 | Kim et al. |

\* cited by examiner

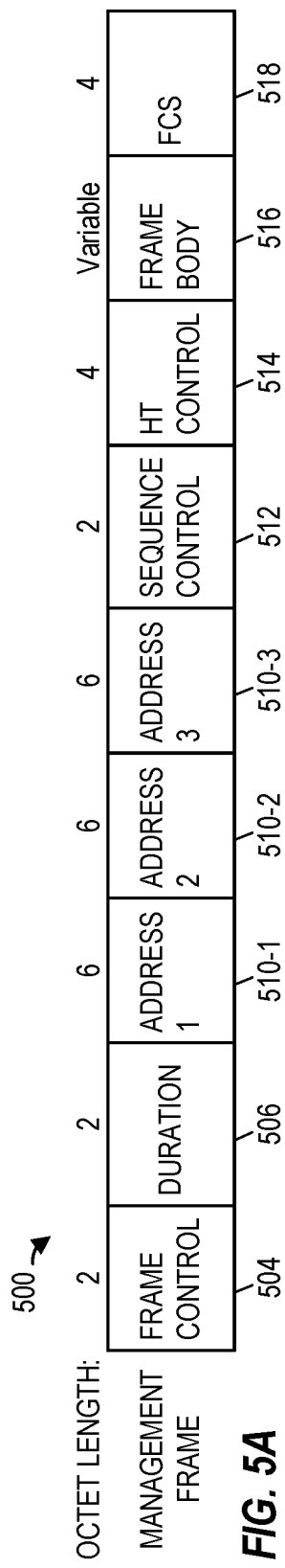
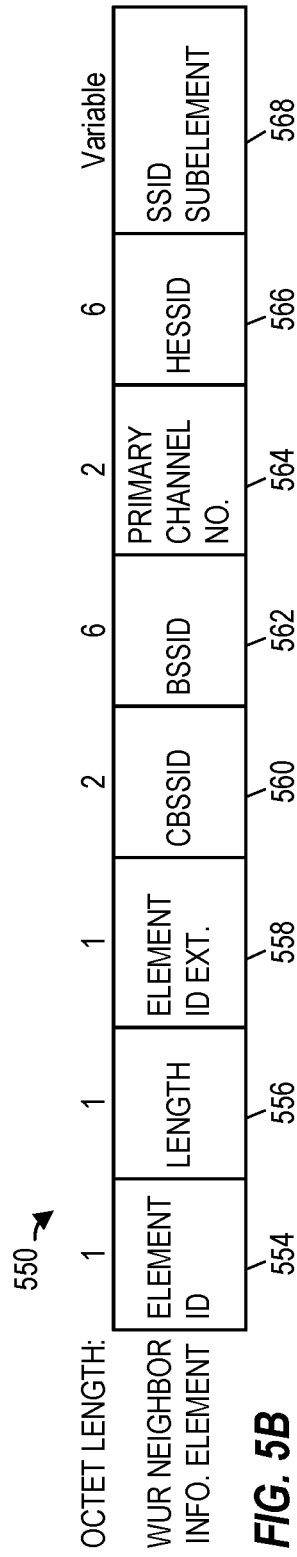
FIG. 5A
FIG. 5B

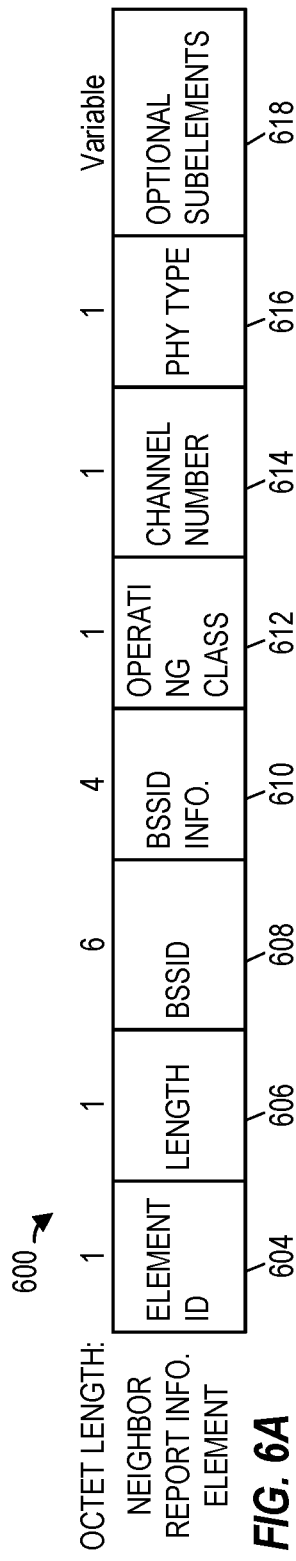

WLAN PACKET WITH NEIGHBOR WAKEUP RADIO INFORMATION

CROSS REFERENCES TO RELATED APPLICATIONS

This application is a continuation of U.S. patent application Ser. No. 17/140,714, now U.S. Pat. No. 10,887,837, entitled "Wakeup Radio Packet with BSS Information," filed on Jan. 4, 2021, which is a continuation of U.S. patent application Ser. No. 16/161,961, now U.S. Pat. No. 10,887,837, entitled "Wakeup Radio Packet with Neighbor Access Point Information," filed on Oct. 16, 2018, which claims the benefit of U.S. Provisional Patent Application No. 62/623,410, entitled "Roaming Through Low Power Wakeup Frame," filed on Jan. 29, 2018. All of the applications referenced above are hereby incorporated herein by reference in their entireties.

FIELD OF TECHNOLOGY

The present disclosure relates generally to wireless communication systems, and more particularly to packets with basic service set (BSS) information for communication systems employing wakeup radios (WURs).

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some WLANs include low cost wireless devices, such as wireless sensors, that do not require high data rates. To reduce operating costs, it may be useful for such wireless devices to be battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wakeup radio (LP-WUR) that consumes much less power as compared to the WLAN network interface. For example, the LP-WUR does not include any transmitter circuitry and may be capable of only receiving very low data rate transmissions. When the access point is ready to transmit data to the wireless device, the access point transmits a wakeup radio (WUR) wakeup packet (referred to herein simply as a "wakeup packet") addressed to the wireless device. In response to receiving the wakeup packet and determining that the wakeup packet is addressed to the wireless device, the LP-WUR wakes up the WLAN network interface so that the WLAN network interface is ready to receive data from the access point.

SUMMARY

In an embodiment, a first communication device for communicating in a wireless local area network (WLAN) comprises: a WLAN network interface device configured to receive, from a second communication device, a WLAN packet that includes a wakeup radio (WUR) identifier for a third communication device; and a WUR coupled to the WLAN network interface device, the WUR configured to receive a WUR packet that includes the WUR identifier; wherein at least one of the WLAN network interface and the WUR are further configured to use the WUR packet to determine whether to change a WLAN association from the second communication device to the third communication device.

In another embodiment, a first communication device for communicating in a WLAN comprises a WLAN network interface device having circuitry configured to: generate a WLAN packet to include a WUR identifier associated with a second communication device that neighbors the first communication device, wherein the WUR identifier is usable by a WUR of a third communication device to identify WUR packets transmitted by the second communication device; and control the WLAN network interface device to transmit the WLAN packet to a WLAN network interface device of the third communication device.

BRIEF DESCRIPTION OF THE DRAWINGS

FIG. 5A is a diagram of an example WLAN packet that includes WUR neighbor information, according to an embodiment.

FIG. 5B is a diagram of an example WUR neighbor information element of the WLAN packet of FIG. 5A that includes WUR neighbor information, according to an embodiment.

FIG. 6A is a diagram of an example neighbor report information element of the WLAN packet of FIG. 5A that includes WUR neighbor information, according to an embodiment.

FIG. 6B is a diagram of an example WUR neighbor information sub-element of the neighbor report information element of FIG. 6A, according to an embodiment.

DETAILED DESCRIPTION

Techniques for generating and processing packets are described below in the context of low power wakeup radios merely for explanatory purposes. In other embodiments, packet generation and processing techniques are utilized in other types of wireless communication systems such as personal area networks (PANs), mobile communication networks such as cellular networks, metropolitan area networks (MANs), satellite communication networks, etc., that use a narrower bandwidth than WLANs.

Figure 1A:
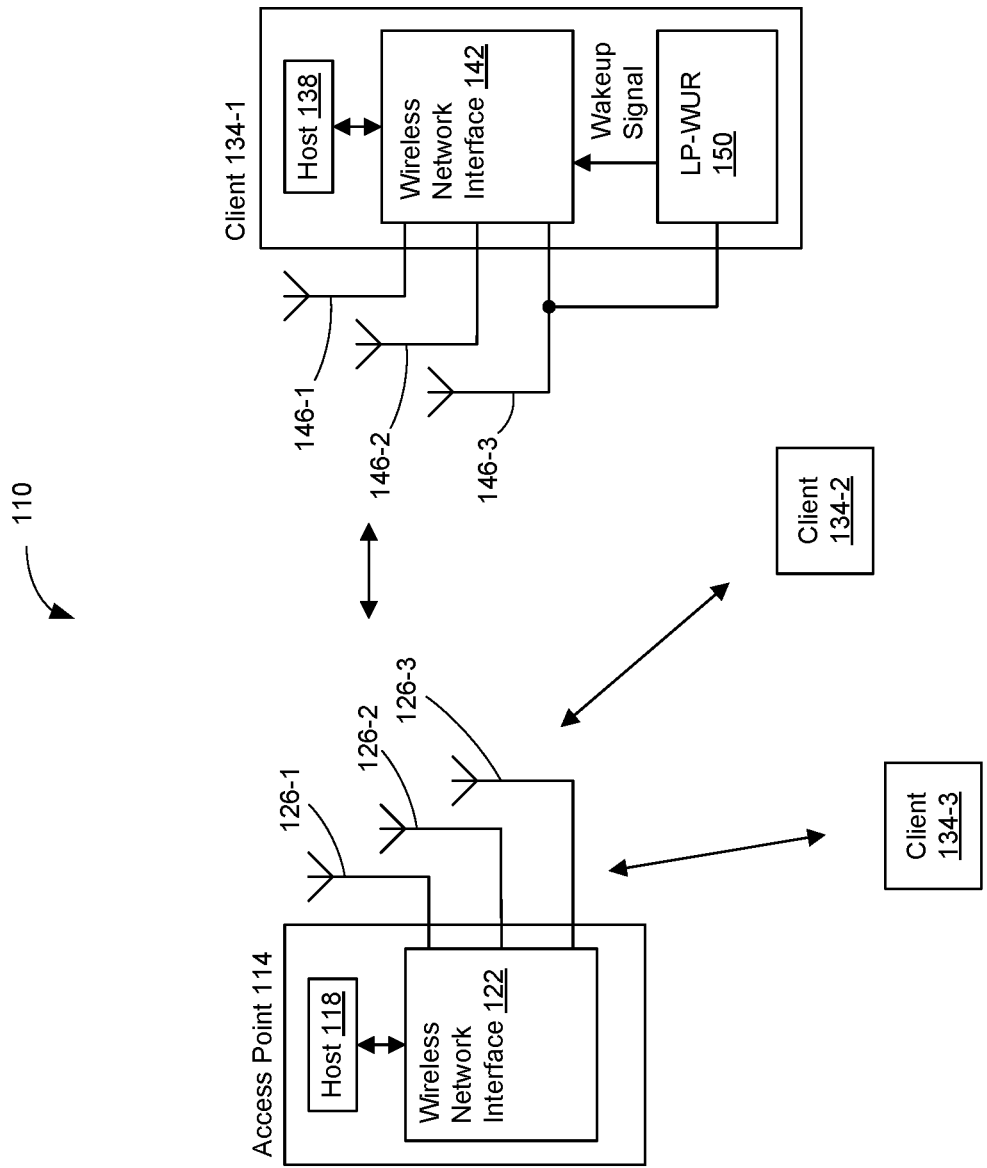
FIG. 1A is a block diagram of an example wireless local area network (WLAN) having a client station with a low power wakeup radio (LP-WUR), according to an embodiment.

FIG. 1A is a block diagram of an example WLAN 110, according to an embodiment. The WLAN 110 includes an access point (AP) 114 that comprises a host processor 118 coupled to a wireless network interface device 122. The wireless network interface device 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface device 122 is configured to generate and transmit a wakeup packet that can be decoded by low power wakeup radios (LP-WURs) in the WLAN 110, wherein the wakeup packet is configured to prompt one or more of the LP-WURs to wake up a WLAN network interface coupled to the LP-WUR.

Additionally, the wireless network interface device 122 is configured to generate packets that can be decoded by at least some of the LP-WURs (e.g., one or more of the LP-WURs) in the WLAN 110, and that include data information instead of, or in addition to, data configured to cause a LP-WUR to wake up a WLAN network interface (sometimes referred to herein as "non-wakeup data"). Packets that can be decoded by at least some of the LP-WURs are referred to herein as "WUR packets". WUR packets may be wakeup packets. WUR packets may also be packets that include non-wakeup data. Examples of non-wakeup data that may be included in WUR packets include WLAN beacon information, WUR capability information, WLAN capability information, WUR management data, WLAN management data, WUR control information, WLAN control information, WLAN neighbor information, WUR neighbor information, etc. In an embodiment, the non-wakeup data can be used by the LP-WUR, and/or the WLAN network interface device that is coupled to the LP-WUR, for purposes other than waking up the WLAN network interface device.

The host processor 118 is configured to execute machine readable instructions stored in a memory device (not shown), according to an embodiment. The host processor 118 is implemented on an integrated circuit (IC), according to an embodiment. The wireless network interface device 122 is implemented on one or more ICs. The host processor 118 is implemented on one IC and the wireless network interface device 122 is implemented on one or more other, different ICs, according to an embodiment. The host processor 118 is implemented on a first IC and the wireless network interface device 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface device 142. The wireless network interface device 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The wireless network interface device 142 is configured to go into a low power state in which the wireless network interface device 142 consumes significantly less power as compared to an active state of the wireless network interface device 142. The wireless network interface device 142 is capable of wirelessly receiving and transmitting via the one or more antennas 146 while in the active state. In an embodiment, the wireless network interface device 142 is incapable of wirelessly receiving and transmitting via the one or more antennas 146 while in the low power state.

The client station 134-1 also includes an LP-WUR 150 coupled to the wireless network interface device 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc.) than the wireless network interface device 142 while the wireless network interface device 142 is in the active state, according to an embodiment.

The LP-WUR 150 is configured to receive and decode wakeup packets transmitted by the AP 114 and received via one or more of the antennas 146. The LP-WUR 150 is configured to determine whether a received wakeup packet includes an address (e.g., a media access control (MAC) address, an association identifier (AID), or another suitable network address) corresponding to the client station 134-1, according to an embodiment. The LP-WUR 150 is configured to generate a wakeup signal in response to determining that a received wakeup packet includes the address corresponding to the client station 134-1. An address corresponding to the client station 134-1 includes one or more of i) a unicast address corresponding to the client station 134-1, ii) a multicast address corresponding to a group of client stations that includes the client station 134-1, and/or iii) a broadcast address that corresponds to all client stations, in various embodiments.

When the wireless network interface device 142 is in the low power state and receives the wakeup signal from the LP-WUR 150, the wireless network interface device 142 is configured to transition to the active power state in response to the wakeup signal, according to an embodiment. For example, when the wireless network interface device 142 is in the low power state and receives the wakeup signal from the LP-WUR 150, the wireless network interface device 142 responsively transitions to the active power state to become ready to transmit and/or receive, according to an embodiment.

The host processor 138 is configured to execute machine readable instructions stored in a memory device (not shown), according to an embodiment. The host processor 138 is implemented on an IC, according to an embodiment. The wireless network interface device 142 is implemented on one or more ICs. The host processor 138 is implemented on one IC and the wireless network interface device 142 is implemented on one or more other, different ICs, according to an embodiment. The host processor 138 is implemented on a first IC and the wireless network interface device 142 is implemented on at least the same first IC and optionally on one or more second ICs, according to an embodiment.

The LP-WUR 150 is implemented on one IC and the wireless network interface device 142 is implemented on one or more other, different ICs, according to an embodiment. The LP-WUR 150 is implemented on a first IC and the wireless network interface device 142 is implemented on at least the same first IC and optionally on one or more second ICs, according to an embodiment.

In an embodiment, the LP-WUR 150 is configured to process wakeup packets that are transmitted at a particular data rate, and is not configured to process WUR packets that include non-wakeup data and/or to process WUR packets at a data rate other than the particular data rate (such LP-WURs are sometimes referred to herein as "basic LP-WURs"). In some embodiments, the LP-WUR 150 is configured to process WUR packets that are transmitted at multiple different data rates, and/or is configured to process WUR packets that include non-wakeup data (such LP-WURs are sometimes referred to herein as "advanced LP-WURs"). A mode of operation in which a WUR packet that includes a wakeup packet is transmitted at the particular data rate is sometimes referred to as a "basic mode". A mode of operation in which a WUR packet includes non-wakeup data and/or is transmitted at a data rate other than the particular data rate is sometimes referred to as an "advanced mode".

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include an LP-WUR, according to another embodiment. In some embodiments, one or more of the client stations 134 are basic LP-WURs and one or more of the other client stations 134 are advanced LP-WURs.

Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

Figure 1B:
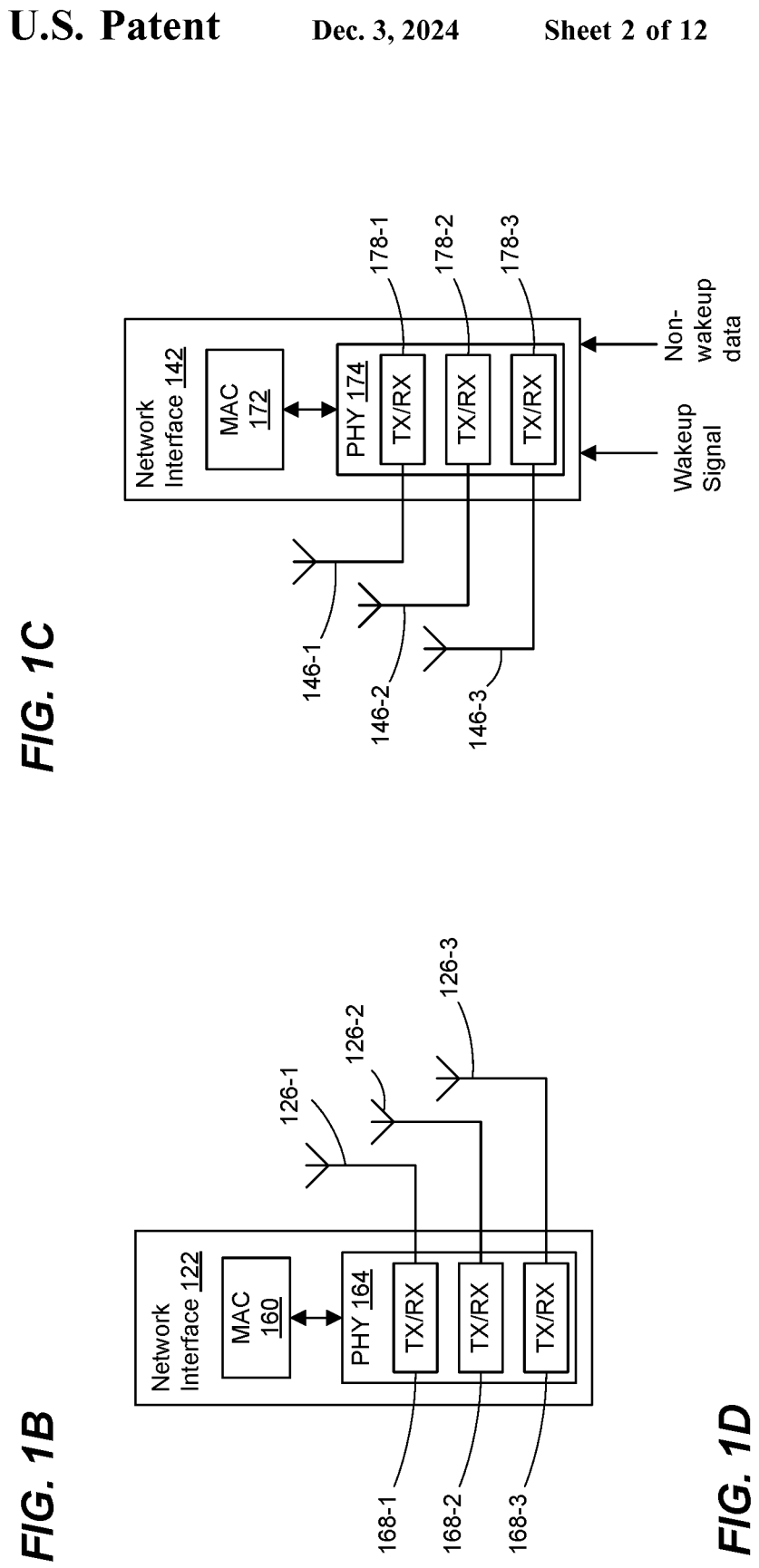
FIG. 1B is a block diagram of an example wireless network interface device of an access point included in the WLAN of FIG. 1A, according to an embodiment.

FIG. 1B is a block diagram of the network interface device 122 of the AP 114 of FIG. 1A, according to an embodiment. The network interface 122 includes a MAC layer processor 160 coupled to a physical layer (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

The network interface 122 is implemented using one or more ICs configured to operate as discussed below. For example, the MAC layer processor 160 may be implemented, at least partially, on a first IC, and the PHY processor 164 may be implemented, at least partially, on a second IC. As another example, at least a portion of the MAC layer processor 160 and at least a portion of the PHY processor 164 may be implemented on a single IC. For instance, the network interface 122 may be implemented using a system on a chip (SoC), where the SoC includes at least a portion of the MAC layer processor 160 and at least a portion of the PHY processor 164.

In various embodiments, the MAC layer processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, the MAC layer processor 160 may be configured to implement MAC layer functions, including MAC layer functions of the WLAN communication protocol, and the PHY processor 164 may be configured to implement PHY functions, including PHY functions of the WLAN communication protocol. For instance, the MAC layer processor 160 may be configured to generate MAC layer data units such as MAC service data units (MSDUs), MAC protocol data units (MPDUs), etc., and provide the MAC layer data units to the PHY processor 164. The PHY processor 164 may be configured to receive MAC layer data units from the MAC layer processor 160 and encapsulate the MAC layer data units to generate PHY data units such as PHY protocol data units (PPDUs) for transmission via the antennas 126. Similarly, the PHY processor 164 may be configured to receive PHY data units that were received via the antennas 126, and extract MAC layer data units encapsulated within the PHY data units. The PHY processor 164 may provide the extracted MAC layer data units to the MAC layer processor 160, which then processes the MAC layer data units. PHY data units that conform to the WLAN communication protocol are sometimes referred to herein as "WLAN packets". MAC data units that conform to the WLAN communication protocol are sometimes referred to herein as "WLAN frames".

In connection with generating one or more radio frequency (RF) signals for transmission, the PHY processor 164 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 164 is configured to upconvert the one or more analog baseband signals to one or more RF signals for transmission via the one or more antennas 138.

In connection with receiving one or more RF signals, the PHY processor 164 is configured to downconvert the one or more RF signals to one or more analog baseband signals, and to convert the one or more analog baseband signals to one or more digital baseband signals. The PHY processor 164 is further configured to process (which may include demodulating, filtering, etc.) the one or more digital baseband signals to generate a PPDU.

The PHY processor 164 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RF signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

In an embodiment, the PHY processor 164 is configured to generate wakeup packets and transmit the wakeup packets at the particular data rate; and the PHY processor 164 is also configured to i) generate WUR packets that include non-wakeup data and/or ii) transmit WUR packets at a data rate other than the particular data rate.

Figure 1C:
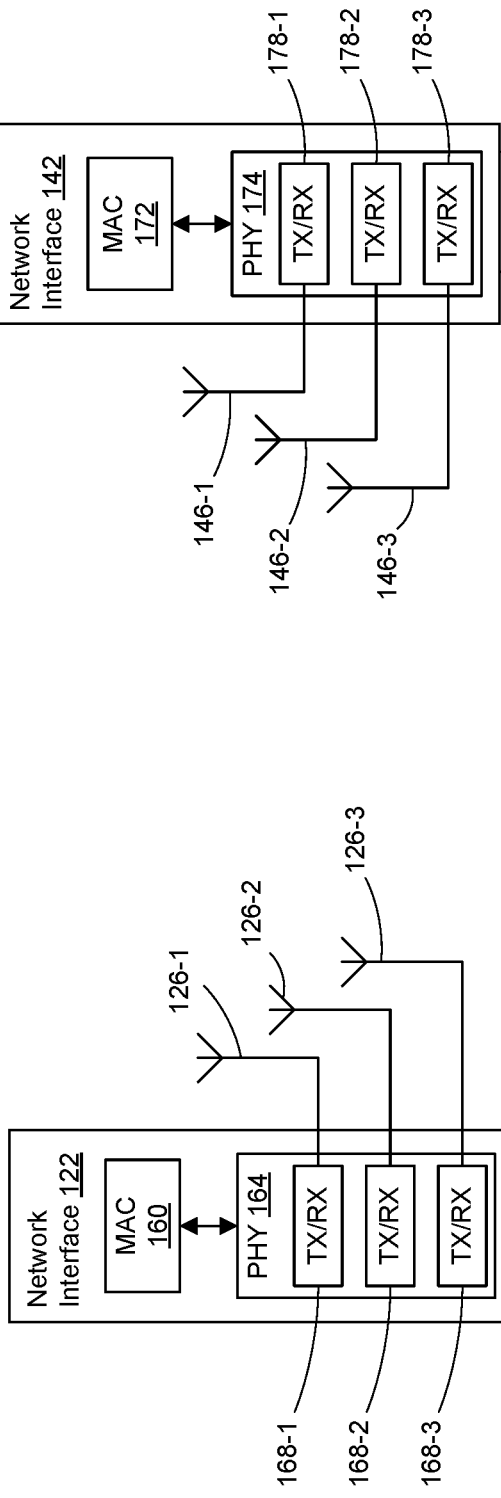
FIG. 1C is a block diagram of an example wireless network interface device of the client station included in the WLAN of FIG. 1A, according to an embodiment.

FIG. 1C is a block diagram of the network interface device 142 of the client station 134-1 of FIG. 1A, according to an embodiment. The network interface 142 includes a MAC layer processor 172 coupled to a PHY processor 174. The PHY processor 174 includes a plurality of transceivers 178 coupled to the one or more antennas 146. Although three transceivers 178 and three antennas 126 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The network interface 142 is implemented using one or more ICs configured to operate as discussed below. For example, the MAC layer processor 172 may be implemented, at least partially, on a first IC, and the PHY processor 174 may be implemented, at least partially, on a second IC. As another example, at least a portion of the MAC layer processor 172 and at least a portion of the PHY processor 174 may be implemented on a single IC. For instance, the network interface 142 may be implemented using a system on a chip (SoC), where the SoC includes at least a portion of the MAC layer processor 172 and at least a portion of the PHY processor 174.

In various embodiments, the MAC layer processor 172 and the PHY processor 174 of the client device 134-1 are configured to generate data units, and process received data units, that conform to the WLAN communication protocol or another suitable communication protocol. For example, the MAC layer processor 172 may be configured to implement MAC layer functions, including MAC layer functions of the WLAN communication protocol, and the PHY processor 174 may be configured to implement PHY functions, including PHY functions of the WLAN communication protocol. The MAC layer processor 172 may be configured to generate MAC layer data units such as MSDUs, MPDUs, etc., and provide the MAC layer data units to the PHY processor 174. The PHY processor 174 may be configured to receive MAC layer data units from the MAC layer processor 172 and encapsulate the MAC layer data units to generate PHY data units such as PPDUs for transmission via the one or more antennas 146. Similarly, the PHY processor 174 may be configured to receive PHY data units that were received via the one or more antennas 146, and extract MAC layer data units encapsulated within the PHY data units. The PHY processor 174 may provide the extracted MAC layer data units to the MAC layer processor 172, which then processes the MAC layer data units.

As discussed above, the network interface device 142 is configured to transition between an active state and a low power state. When the wireless network interface device 142 is in the low power state and receives the wakeup signal from the LP-WUR 150, the wireless network interface device 142 is configured to transition to the active power state in response to the wakeup signal, according to an embodiment.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., an LNA, a power amplifier, etc.), an RF downconverter, an RF upconverter, a plurality of filters, one or ADCs, one or more DACs, one or more DFT calculators (e.g., a fast Fourier transform (FFT) calculator), one or more IDFT calculators (e.g., an inverse fast Fourier transform (IFFT) calculator), one or more modulators, one or more demodulators, etc.

The PHY processor 174 is configured to generate one or more RF signals that are provided to the one or more antennas 146. The PHY processor 174 is also configured to receive one or more RF signals from the one or more antennas 146.

The MAC processor 172 is configured to control the PHY processor 174 to generate one or more RF signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

In some embodiments in which the wireless network interface device 142 is coupled to an advanced LP-WUR, the wireless network interface device 142 is configured to receive non-wakeup data from the LP-WUR 150, such as WLAN beacon information, WUR capability information, WLAN capability information, WUR configuration information, WLAN configuration information, WUR management information, WLAN management information, WUR control information, WLAN control information, WLAN neighbor information, WUR neighbor information, etc. In an embodiment, the wireless network interface device 142 is configured to use the non-wakeup data for purposes other than transitioning to the active power state. For example, the MAC processor 172 of the wireless network interface device 142 is configured to use the non-wakeup data for performing MAC-related functions related to WLAN communications.

In some embodiments in which the wireless network interface device 142 is coupled to a basic LP-WUR, the wireless network interface device 142 is not configured to receive non-wakeup data from the LP-WUR 150.

Figure 1D:
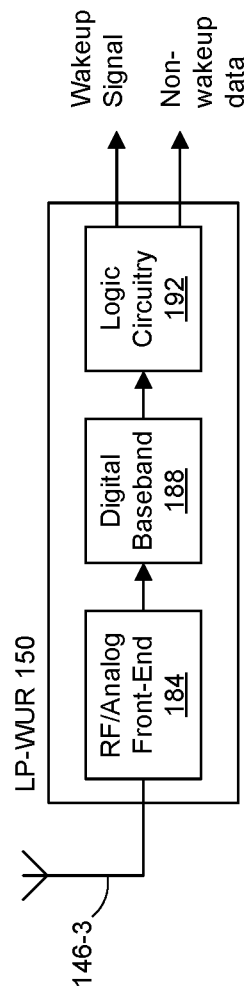
FIG. 1D is a block diagram of an example LP-WUR in the WLAN of FIG. 1A, according to an embodiment.

FIG. 1D is a block diagram of the LP-WUR 150 of the client station 134-1 of FIG. 1A, according to an embodiment. The LP-WUR 150 includes radio frequency (RF)/analog front-end circuitry 184 coupled to at least one of the antennas 146. The RF/analog front-end circuitry 184 includes one or more amplifiers (e.g., a low noise amplifier (LNA)), an RF downconverter, one or more filters, and one or more analog-to-digital converters (ADCs). In an embodiment, the RF/analog front-end circuitry 184 is configured to downconvert an RF signal to a baseband analog signal, and convert the analog baseband signal to a digital baseband signal.

The RF/analog front-end circuitry 184 is coupled to digital baseband circuitry 188. The digital baseband circuitry 188 is configured to process the digital baseband signal to determine whether the digital baseband signal corresponds to a WUR packet. The digital baseband circuitry 188 includes a demodulator that demodulates data from the digital baseband signal to generate an information signal corresponding to information included in a wakeup packet.

In some embodiments in which the LP-WUR 150 is a basic LP-WUR, the digital baseband circuitry 188 is configured to assume that WUR packets are transmitted at a fixed data rate. In some embodiments in which the LP-WUR 150 is a basic LP-WUR, the digital baseband circuitry 188 is configured to assume that WUR packets are a fixed length.

In some embodiments in which the LP-WUR 150 is an advanced LP-WUR, the digital baseband circuitry 188 is configured to assume that WUR packets can be transmitted at multiple different data rates, and is configured to determine the data rate of a particular packet using techniques described below. In some embodiments in which the LP-WUR 150 is an advanced LP-WUR, the digital baseband circuitry 188 is configured to assume that WUR packets have different lengths, and is configured to determine the length of a particular packet using techniques described below.

The digital baseband circuitry 188 is coupled to logic circuitry 192. The logic circuitry 192 is configured to process the information signal to determine whether the information signal includes an address (e.g., a MAC address, an AID, or another suitable network address) corresponding to the client station 134-1, according to an embodiment. In embodiments in which the LP-WUR 150 is a basic LP-WUR, the logic circuitry 192 is configured to generate the wakeup signal in response to determining that the information signal includes the address corresponding to the client station 134-1. In embodiments in which the LP-WUR 150 is an advanced LP-WUR, the logic circuitry 192 is configured to generate the wakeup signal in response to determining that the information signal corresponds to a wakeup packet that includes the address corresponding to the client station 134-1.

In embodiments in which the LP-WUR 150 is an advanced LP-WUR, the LP-WUR 150 is configured to provide non-wakeup data, such as WLAN beacon information, WUR capability information, WLAN capability information, WUR configuration information, WLAN configuration information, WUR management information, WLAN management information, WUR control information, WLAN control information, etc., to the wireless network interface device 142. In some embodiments in which the LP-WUR 150 is an advanced LP-WUR, the LP-WUR 150 is configured to use at least some types of non-wakeup data such as WUR capability information, WUR configuration information, WUR management information, WUR control information, etc.

In some embodiments in which the LP-WUR 150 is an advanced LP-WUR, the LP-WUR 150 includes, in addition to or instead of the logic circuitry 192, a processor (not shown) that is configured to execute machine readable instructions stored in a memory (not shown) of the LP-WUR 150. In some embodiments, the processor (not shown) of the LP-WUR 150 is configured to execute machine readable instructions to one or more of: i) process and/or use non-wakeup data, ii) provide non-wakeup data to the network interface device 142, iii) generate the wakeup signal, etc.

Referring to FIG. 1A, the network 110 includes at least one client station 134 having a basic LP-WUR and at least one client station 134 having an advance LP-WUR, according to an embodiment. In another embodiment, all of the client stations 134 have advanced LP-WURs.

Figure 2:
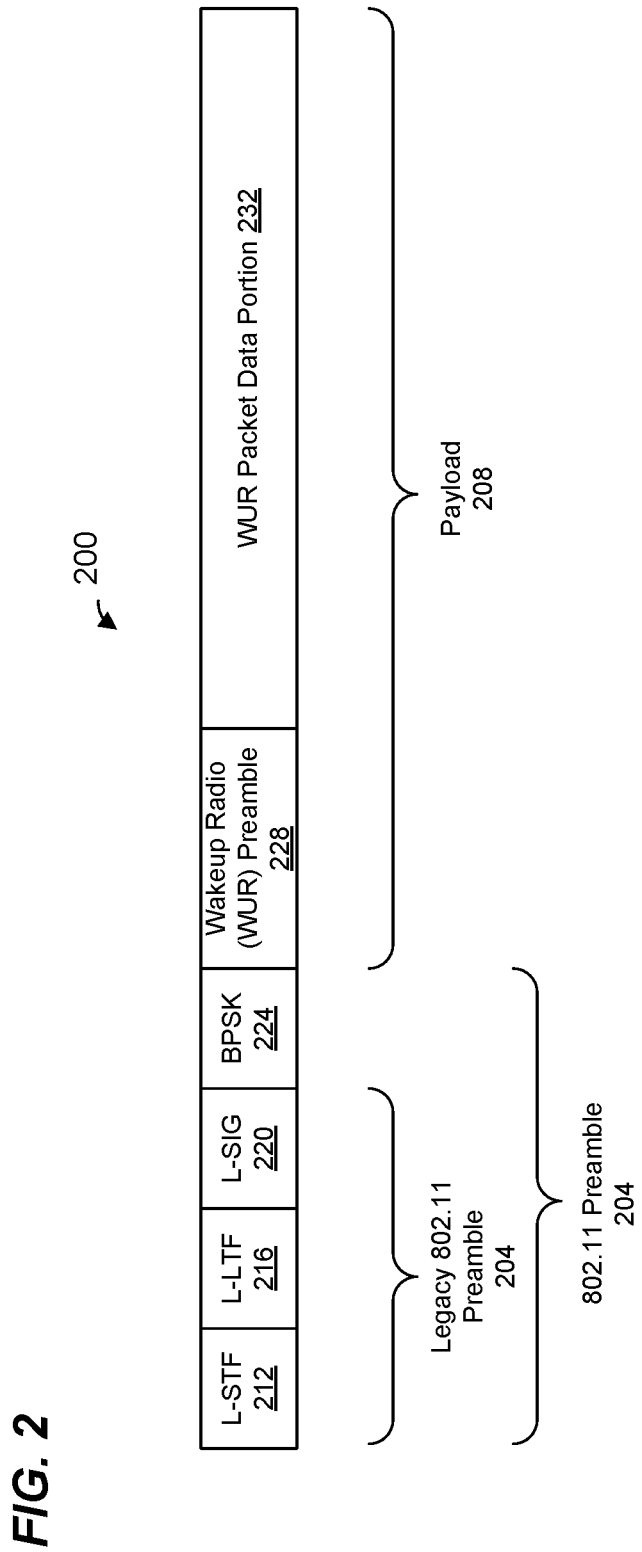
FIG. 2 is a diagram of an example wakeup radio (WUR) packet, according to an embodiment.

FIG. 2 is a block diagram of a WUR packet 200 used in the example WLAN 110 of FIG. 1, according to an embodiment. The network interface 122 of the AP 114 is configured to generate and transmit the WUR packet 200, according to an embodiment. The network interface 142 of the client station 134-1 is also configured to generate and transmit the WUR packet 200, e.g., to another client station 134, according to another embodiment.

The LP-WUR 150 of the client station 134-1 is configured to receive, detect, and decode the WUR packet 200, according to an embodiment.

The WUR packet 200 includes an 802.11 preamble portion 204 and a payload 208. The 802.11 preamble portion 204 enables IEEE 802.11 stations (e.g., wireless communication devices that are configured to operate according to the IEEE 802.11 Standard) to detect the WUR packet 200 and determine a length of the WUR packet 200 for the purpose of reducing transmissions by IEEE 802.11 stations that will collide with the WUR packet 200, according to an embodiment.

The 802.11 preamble portion 204 includes a legacy 802.11 preamble 210, which corresponds to a legacy preamble defined by the IEEE 802.11 Standard, according to an embodiment. The legacy 802.11 preamble 210 includes a legacy short training field (L-STF) 212, a legacy long training field (L-LTF) 216, a legacy signal field (L-SIG) 220. The L-STF 212 includes signals designed for packet detection and automatic gain control (AGC) training, for example. The L-LTF 216 includes signals designed for channel estimation, for example. The L-SIG 220 includes information regarding the WUR packet 200, including length information (e.g., in a length subfield (not shown)) that can be used by IEEE 802.11 stations to determine when the WUR packet 200 will end.

In other embodiments, the WUR packet 200 includes a legacy preamble (different than the legacy 802.11 preamble 210) that enables stations that conform to a different suitable wireless communication protocol (e.g., other than the IEEE 802.11 Standard) to detect the WUR packet 200 and determine a length of the WUR packet 200 for the purpose of reducing transmissions by such stations that will collide with the WUR packet 200, according to an embodiment.

In an embodiment, the 802.11 preamble portion 204 also includes an orthogonal frequency division multiplexing (OFDM) symbol 224 having binary phase shift keying (BPSK) modulated OFDM subcarriers that follows the legacy 802.11 preamble 210. In an embodiment, the OFDM symbol 224 is a repetition of the L-SIG 220. In an embodiment, the OFDM symbol 224 is identical to at least a portion of the L-LTF 216. In other embodiments, the OFDM symbol 224 includes any other suitable signal and/or information. In an embodiment, the OFDM symbol 224 does not convey any useful information to recipient communication devices. In another embodiment, the OFDM symbol 224 does convey useful information to recipient communication devices. In some embodiments, the OFDM symbol 224 is omitted from the WUR packet 200.

The payload 208 includes a WUR preamble 228. In an embodiment, the WUR preamble 228 includes signals that enable LP-WURs such as the LP-WUR 150 to detect the payload 208 of the WUR packet 200 and to synchronize to the payload 208 of the WUR packet 200. The payload 208 also includes a WUR packet data portion 232. In an embodiment, the WUR packet data portion 232 includes an address (e.g., a MAC address, an AID, or another suitable network address) corresponding to a client station (or client stations) to which the WUR packet 200 is intended. Referring now to FIG. 1D, the digital baseband circuitry 188 is configured to detect the WUR packet 200 at least by detecting the WUR preamble 228, according to an embodiment. The logic circuitry 192 is configured to process the WUR packet body 232 to determine whether the WUR packet body 232 includes an address (e.g., a MAC address, an AID, or another suitable network address) corresponding to the client station 134-1.

In an embodiment, the legacy 802.11 preamble 210 spans a first frequency bandwidth, and the WUR preamble 228 and the WUR packet data portion 232 span a second frequency bandwidth that is narrower than the first frequency bandwidth. For example, the first frequency bandwidth is 20 MHz and the second frequency bandwidth is a narrower bandwidth such as approximately 4 MHz (e.g., 4.06 MHz), or another suitable narrower bandwidth such as 1 MHz, 2 MHz, 5 MHz, 10 MHz, etc.

Figure 3:
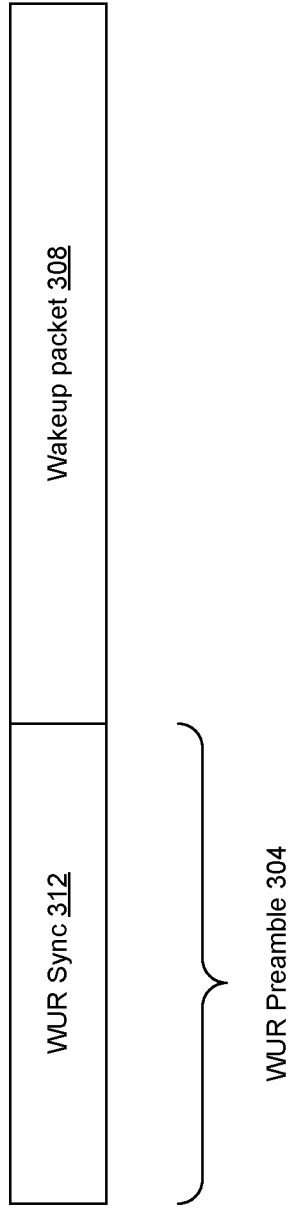
FIG. 3 is a diagram of an example payload of the WUR packet of FIG. 2 when the WUR packet is transmitted according to a first physical layer (PHY) transmission mode, according to an embodiment.

FIG. 3 is a diagram of an example payload portion 300 of a WUR packet (such as the WUR packet 200 of FIG. 2) that basic LP-WURs are configured to detect and process (sometimes referred to herein as a "base mode WUR packet"), according to an embodiment. The payload portion 300 is used as the payload 208 of the WUR packet 200 of FIG. 2, according to an embodiment. FIG. 3 is described in the context of the WUR packet 200 of FIG. 2 for explanatory purposes. In other embodiments, however, the payload portion 300 is included in another suitable WUR packet different than the WUR packet 200 of FIG. 2.

The payload portion 300 includes a WUR preamble 304 and a wakeup packet 308 (e.g., corresponding to the WUR data portion 232 of FIG. 2). The WUR preamble 304 includes a WUR sync portion 312. The WUR sync portion 312 is used by a wakeup radio (e.g., the LP-WUR 150 of FIG. 1) for one or more of carrier sensing, detection of the payload portion 300, synchronization to the payload portion 300, etc.

In an embodiment, the payload portion 300 is modulated/encoded according to a fixed data rate defined by a communication protocol. As an illustrative embodiment, the payload portion 300 has a data rate of 62.5 kilobits per second (kbps). In other embodiments, the payload portion 300 has another suitable data rate other than 62.5 kbps (e.g., 250 kbps or another suitable data rate). As an illustrative embodiment, the payload portion 300 is modulated using on-off keying (OOK) modulation. In other embodiments, the payload portion 300 is modulated using another suitable modulation scheme other than OOK.

In an embodiment, the payload portion 300 has a fixed length defined by the communication protocol. As an illustrative embodiment, the payload portion 300 has a length of 48 bits. As another illustrative embodiment, the payload portion 300 has a length of 20 bits. In other embodiments, the payload portion 300 has another suitable length other than 48 bits or 20 bits. As an illustrative embodiment, the payload portion 300 consists of a 16 bit station identifier (ID) and/or basic service set (BSS) color field and a 4 bit error detection field (e.g., a cyclic redundancy check (CRC) field). The station ID/BSS color field includes a network address that indicates which client station(s) is/are to be woken up. In other embodiments, the payload portion 300 includes one or more other suitable fields and/or omits the error detection field. In other embodiments, the station ID/BSS color field and/or the error detection field have other suitable lengths.

Figure 4:
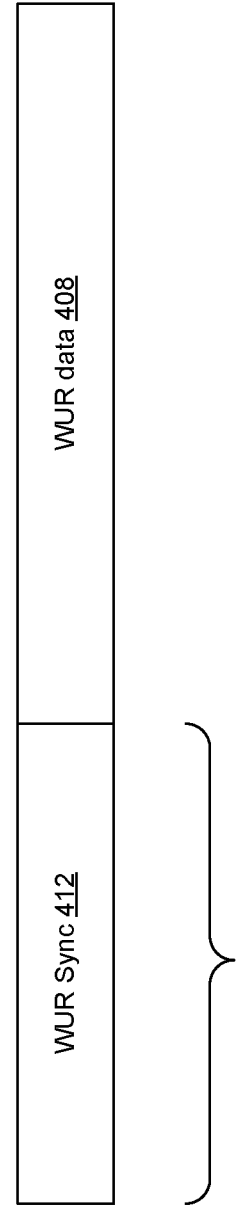
FIG. 4 is a diagram of an example payload of the WUR packet of FIG. 2 when the WUR packet is transmitted according to a second PHY transmission mode, according to an embodiment.

FIG. 4 is a diagram of an example payload portion 400 of a WUR packet (such as the WUR packet 200 of FIG. 2) that advanced LP-WURs are configured to detect and process (sometimes referred to herein as an "advanced mode WUR packet"), according to an embodiment. The payload portion 400 is used as the payload 208 of the WUR packet 200 of FIG. 2, according to an embodiment. FIG. 4 is described in the context of the WUR packet 200 of FIG. 2 for explanatory purposes. In other embodiments, however, the payload portion 400 is included in another suitable WUR packet different than the WUR packet 200 of FIG. 2.

The payload portion 400 includes a WUR preamble 404 and a WUR data portion 408 (e.g., corresponding to the WUR data portion 232 of FIG. 2). The WUR preamble 404 includes a WUR sync portion 412. The WUR sync portion 412 is used by a wakeup radio (e.g., the LP-WUR 150 of FIG. 1) for one or more of carrier sensing, detection of the payload portion 400, synchronization to the payload portion 400, etc.

In an embodiment in which the payload portion 300 (FIG. 3) of the base mode WUR packet is modulated/encoded according to a first fixed data rate, the payload portion 400 is modulated/encoded according to a second fixed data rate that is higher than the first fixed data rate. As an illustrative embodiment, the payload portion 300 (FIG. 3) of the base mode WUR packet has a data rate of 62.5 kbps, whereas the payload portion 400 of the advanced mode WUR packet has a data rate of 250 kbps. In other embodiments, the payload portion 400 has another suitable data rate other than 250 kbps. As an illustrative embodiment, the payload portion 400 is modulated using OOK. In other embodiments, the payload portion 400 is modulated using another suitable modulation scheme other than OOK.

In an embodiment, the payload portion 400 has a variable length. In an embodiment, the payload portion 400 comprises a data field and an error detection field (e.g., a CRC field, a frame check sequence (FCS) field, etc.). In other embodiments, the payload portion 400 includes one or more other suitable fields and/or omits the error detection field.

Referring now to FIGS. 3 and 4, the WUR sync field 312 and the WUR sync field 412 are configured to indicate to an advanced LP-WUR whether a WUR packet is a base mode WUR packet or and advanced mode WUR packet. In an embodiment, the WUR sync field 312 has a first duration and the WUR sync field 412 has a second duration that is different than the first duration. In an embodiment, the first duration is twice the second duration.

Referring now to FIGS. 1D, 3, and 4, the LP-WUR 150 is configured to detect the WUR sync 312 and the WUR sync 412 in WUR packets, according to an embodiment. When the LP-WUR 150 detects the WUR sync 312 in a WUR packet, the LP-WUR 150 processes the WUR packet according to a format of the base mode WUR packet; and when the LP-WUR 150 detects the WUR sync 412 in a WUR packet, the LP-WUR 150 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the LP-WUR 150 detects the WUR sync 312 in a WUR packet, the LP-WUR 150 processes the WUR packet according to the first fixed data rate; and when the LP-WUR 150 detects the WUR sync 412 in a WUR packet, the LP-WUR 150 processes the WUR packet according to the second fixed data rate.

The digital baseband circuitry 188 is configured to detect the WUR sync 312 and the WUR sync 412 in WUR packets, according to an embodiment. When the digital baseband circuitry 188 detects the WUR sync 312 in a WUR packet, the digital baseband circuitry 188 and/or the logic circuitry 192 processes the WUR packet according to a format of the base mode WUR packet; and when the LP-WUR 150 detects the WUR sync 412 in a WUR packet, the digital baseband circuitry 188 and/or the logic circuitry 192 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the digital baseband circuitry 188 detects the WUR sync 312 in a WUR packet, the digital baseband circuitry 188 processes the WUR packet according to the first fixed data rate; and when the digital baseband circuitry 188 detects the WUR sync 412 in a WUR packet, the digital baseband circuitry 188 processes the WUR packet according to the second fixed data rate.

In an embodiment, when the digital baseband circuitry 188 detects the WUR sync 312 in a WUR packet, the digital baseband circuitry 188 generates a signal that indicates to the logic circuitry 192 that the WUR packet is a base mode WUR packet; and when the LP-WUR 150 detects the WUR sync 412 in a WUR packet, the digital baseband circuitry 188 generates a signal that indicates to the logic circuitry 192 that WUR packet is an advanced mode WUR packet.

In an embodiment, basic LP-WURs are not capable of detecting the WUR sync 412 and/or assume that all WUR packets are base mode WUR packets; e.g., basic LP-WURs process all detected WUR packets as if they are base mode WUR packets. In some embodiments in which base mode WUR packets are transmitted at a first fixed data rate and advanced mode WUR packets are transmitted at a second fixed data rate (which is higher than the first fixed data rate): basic LP-WURs process all detected WUR packets according to the first fixed data rate.

In some scenarios, a client station performs a WLAN channel scan for roaming purposes. These roam scans are triggered when link quality degrades, in some embodiments. These roam scans take time because the scan is typically done on multiple WLAN channels, and on each channel the client station either conducts an active scan during which it sends a probe request and typically stays awake until it receives a probe response, or a passive scan during which it dwells on each channel for at least a Beacon interval to receive a Beacon from an AP. Accordingly, scanning through multiple channels introduces roaming latency and consumes power. In some scenarios, the roam scan conflicts with regular data exchange.

In an embodiment of a WUR-facilitated roam scan, the client station passively scans through multiple WLAN channels using its WUR, and collects basic information about nearby APs. The collected info can be used to facilitate the client station's roaming decisions. Because the WUR consumes less power than the WLAN network interface device, the WUR-facilitated roam scan provides an ultra-low power roam scan. In some embodiments and/or scenarios, due to the low power operation of the WUR, the WUR scan is performed more frequently in the background than could be by only the WLAN network interface device, and thus roaming information can be readily available whenever needed, i.e., it reduces roaming latency.

In various embodiments, the AP 114 is configured to provide information to client stations 134 that facilitates roaming and/or location determination using the LP-WUR 150 of the client stations 134. In some embodiments, the AP 114 provides information ("WUR neighbor information") about neighbor APs to client stations 134 in a suitable IEEE 802.11 packet, for example, a packet that includes WUR neighbor information element 550, described below. In an embodiment, for example, the AP 114 provides WUR neighbor information to the client stations in a management frame or control frame. In some embodiments, the AP 114 provides AP information about itself in a WUR packet, for example, an advanced mode WUR packet. In an embodiment, a client station 134 receives WUR neighbor information and AP information from a plurality of APs in suitable WLAN packets and advanced mode WUR packets and uses the information to roam between the APs and/or determine its location, for example, based on content of the packets and/or received signal strength of the packets.

In various embodiments, the WUR neighbor information includes one or more of a WUR identifier, a service set identifier (SSID), a compressed service set identifier (CSSID), a basic service set identifier (BSSID), a compressed basic service set identifier (CBSSID), primary channel information, a homogenous SSID (HESSID), a beacon time difference, or other suitable information. With such information from one or more neighbor APs, a client station can determine whether it can associate with one of the neighbor APs without needing to perform off-channel scanning using the "main" IEEE 802.11 radio (e.g., the WLAN network interface device).

In embodiment, the CBSSID is a twelve bit identifier that identifies an AP, for example, similar to a BSSID but having a shorter length and thus being less "unique." In other embodiments, the CBSSID has more or fewer than 12 bits, for example, 10 bits, 16 bits, 24 bits, etc. The primary channel information includes a first octet that identifies a channel class and a second octet that identifies a channel number of a primary 20 MHz channel of an AP, in an embodiment. The beacon time difference indicates a time interval between a WLAN beacon and a WUR beacon, or a CBSSID announcement and a WLAN beacon, in an embodiment.

FIG. 5A is a diagram of an example WLAN packet 500 that includes WUR neighbor information, according to an embodiment. The AP 114 transmits the WLAN packet 500 to the client station 134-1 to facilitate roaming and/or location determination using the LP-WUR 150 of the client station 134-1, in various embodiments. In various embodiments, at least a portion of the WLAN packet 500 generally conforms to the IEEE Standard for Information Technology, Part 11: Wireless LAN Medium Access Control (MAC) and Physical Layer (PHY) Specifications, Amendment 4, Enhancements for Very High Throughput for Operation in Bands below 6 GHz, 2013 ("the IEEE 802.11ac-2013 standard"), the disclosure of which is incorporated herein by reference in its entirety. In the embodiment shown in FIG. 5A, the WLAN packet 500 is a management frame with at least a portion that conforms to the IEEE 802.11ac-2013 standard or the IEEE 802.11ax draft standard. For example, the WLAN packet 500 is a probe response frame, beacon frame, or other suitable management frame. In other embodiments, the WLAN packet 500 is a different frame, such as a control frame or other suitable frame that includes WUR neighbor information.

In the embodiment shown in FIG. 5A, the WLAN packet 500 is a management frame. The number above each field in FIG. 5A indicates the number of octets ("Octet Length") occupied by the corresponding field. Accordingly, the WLAN packet 500 includes a frame control field 504 (2 octets), a duration/ID field 506 (2 octets), a first address (A1) field 510-1 (6 octets), a second address (A2) field 510-2 (6 octets), a third address (A3) field (6 octets) 510-3, a sequence control field 512 (2 octets), an HT control field 514 (4 octets), a frame body (variable length) 516, and a frame check sequence (4 octets) 518. In some embodiments, the frame body 516 is omitted (e.g., a null data frame). Each of the address fields 510 is a 48 bit (6 octet) field that includes a globally unique MAC address of a device associated with the WLAN packet 500, such as a transmitting device of the WLAN packet 500, a receiving device of the WLAN packet 500, etc. In some embodiments, the WLAN packet 500 omits one or more fields illustrated in FIG. 5A. In some embodiments, the WLAN packet 500 includes additional fields not illustrated in FIG. 5A. In various embodiments, the WLAN packet 500 includes the WUR neighbor information within the frame body 518.

FIG. 5B is a diagram of an example WUR neighbor information element 550 of the WLAN packet 500 of FIG. 5A that includes WUR neighbor information, according to an embodiment. The number above each field in FIG. 5B indicates the number of octets ("Octet Length") occupied by the corresponding field. Accordingly, the WUR neighbor information element 550 includes an element ID field 554 (1 octet), a length field 556 (1 octet), an element ID extension field 558 (1 octet), a CBSSID field 560 (2 octets), a BSSID field (6 octets), a primary channel information field 564 (2 octets), an HESSID field 566 (6 octets), and an SSID field 568 (variable length).

The contents of the element ID field 554 and element ID extension field 558 indicate that the information element is a WUR neighbor information element. In an embodiment, the element ID extension field 558 is omitted. The length field 556 specifies the number of octets following the length field 556. The contents of the CBSSID field 560 identify a BSSID of an AP, in an embodiment. The CBSSID has a length that is shorter than a BSSID to facilitate transmission via a non-WLAN communication channel, for example, a WUR packet. In some embodiments, the CBSSID is a subset of a BSSID, for example, the 12 least significant bits of the BSSID. In an embodiment, the CBSSID field 560 provides an announcement of a neighbor AP, for example, so that a client station can monitor for WUR packets from the neighbor AP or initiate contact with the neighbor AP using the CBSSID.

The primary channel field 564 includes primary channel information for the AP identified by the CBSSID. In an embodiment, the primary channel information includes a first octet that identifies a channel class and a second octet that identifies a channel number of a primary 20 MHz channel of the AP. In an embodiment, a client station that receives the primary channel information avoids a "channel scan" of multiple WLAN channels to locate the AP by using the identified channel information. The HESSID field 566 includes an identifier of the HESS to which the BSS (of the BSSID field 562) belongs. The SSID field 568 includes an identifier of the service set to which the BSS (of the BSSID field 562) belongs.

FIG. 6A is a diagram of an example neighbor report information element 600 of the WLAN packet 500 of FIG. 5A that includes WUR neighbor information, according to an embodiment. The number above each field in FIG. 6A indicates the number of octets ("Octet Length") occupied by the corresponding field. Accordingly, the neighbor report information element 600 includes an element ID field 604 (1 octet), a length field 606 (1 octet), a BSSID field 608 (6 octets), a BSSID information field 610 (4 octets), an operating class field 612 (1 octet), a channel number field 614 (1 octet), a PHY type field 616 (1 octet), and one or more optional subelement fields 618 (variable length).

In some embodiments, one or more fields of the neighbor report information element 600 generally correspond to a Neighbor Report information element of the IEEE 802.11ac-2013 standard. In an embodiment, for example, the neighbor report information element 600 describes a BSS of a neighbor access point where the BSSID field 608 contains the BSSID of the BSS being reported. In an embodiment, the contents of the operating class field 612 and the channel number field 614 generally correspond to the primary channel information field 564.

FIG. 6B is a diagram of an example WUR neighbor information sub-element 620 of the neighbor report information element 600 of FIG. 6A, according to an embodiment. The number above each field in FIG. 6B indicates the number of octets ("Octet Length") occupied by the corresponding field. Accordingly, the WUR neighbor information sub-element 650 includes an element ID field 624 (1 octet), a length field 626 (1 octet), an element ID extension field 628 (1 octet), and a CBSSID field 630 (2 octets), in an embodiment. The fields 624, 626, 628, and 630 of the WUR neighbor information sub-element 620 generally correspond to the fields 554, 556, 558, and 560 of the WUR neighbor information element 550, but instead of being contained within a dedicated information element for WUR neighbor information, the fields are contained as a subelement within the neighbor report information element. In other embodiments, the WUR neighbor information sub-element 620 includes additional fields of WUR neighbor information, or fewer fields.

Figure 7:
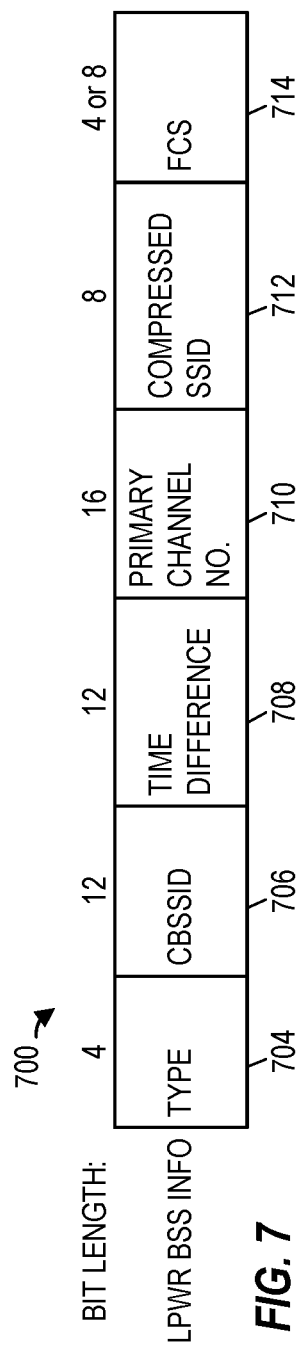
FIG. 7 is a diagram of an example WUR data portion of a WUR packet that includes WUR neighbor information, according to an embodiment.

FIG. 7 is a diagram of an example WUR data portion 700 of a WUR packet that includes WUR neighbor information, according to an embodiment. In an embodiment, the AP 114 generates and transmits the WUR data portion 700 in the advanced mode WUR packet 400 and the WUR data portion 700 generally corresponds to the WUR data portion 408. The number above each field in FIG. 7 indicates the number of bits ("Bit Length") occupied by the corresponding field. Accordingly, the WUR data portion 700 includes a type field 704 (4 bits), a CBSSID field 706 (12 bits), a time difference field 708 (12 bits), a primacy channel information field 710 (16 bits), a compressed SSID field 712 (8 bits), and a frame check sequence 714 (4 or 8 bits). In other embodiments, the WUR data portion 700 includes additional or fewer fields. In an embodiment, for example, the WUR data portion 700 includes an HESSID field (similar to the HESSID field 566) or a compressed HESSID field (e.g., an 8 bit, 16 bit, or other suitable length hash of a 48 bit HESSID, not shown). In contrast to the WUR neighbor information element 550 and the WUR neighbor information sub-element 620, which are transmitted in a WLAN packet by an AP to a WLAN network interface device of a client station, the WUR data portion 700 is generated and transmitted in a WUR packet to a WUR of a client station.

The type field 704 includes an identifier that indicates the format of the WUR data portion 700. The contents of the CBSSID field 706 identify a BSSID of an AP, in an embodiment, similar to the CBSSID field 560. In an embodiment, the time difference field 708 indicates a time interval between a WLAN beacon packet (transmitted to a WLAN network interface device) and a WUR beacon packet (transmitted to a WUR) that are transmitted by a same AP. In an embodiment, a client station that receives the WUR beacon packet waits for a time period corresponding to the time difference field 708 before waking its WLAN network interface device to receive the WLAN beacon packet. The primary channel information field 710 generally corresponds to the primary channel information field 564, in an embodiment. The compressed SSID field 712 includes a 8-bit hash of an SSID of the transmitting AP. In other embodiments, the compressed SSID field 712 has a different length that includes a corresponding hash of the SSID, for example, a 16 bit length for a 16 bit hash. The frame check sequence 714 is a 4 bit, 8 bit, or other suitable length error detection field.

Figure 8:
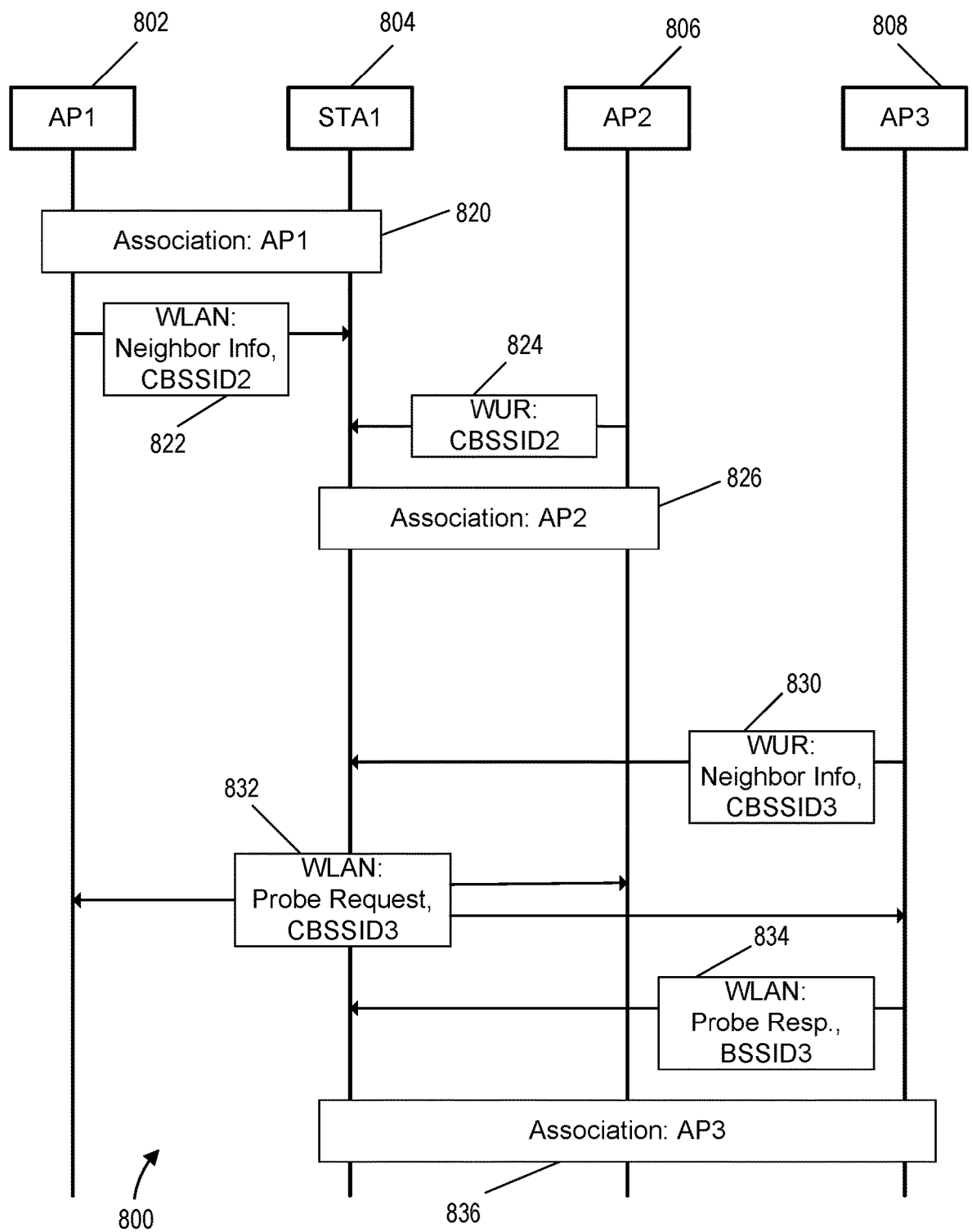
FIG. 8 is a message flow diagram for transmitting a WLAN packet and a WUR packet that contain WUR neighbor information, according to an embodiment.

FIG. 8 is a message flow diagram 800 for transmitting a WLAN packet and a WUR packet that contain WUR neighbor information, according to an embodiment. In the embodiment shown in FIG. 8, provided for explanatory purposes, a client station 804 (STA1) associates with, at different times, a first AP 802, a second AP 806, and a third AP 808. The first AP 802 has a BSSID "AP1" and CBSSID "CBSSID1", the second AP 806 has a BSSID "AP2" and CBSSID "CBSSID2", and the third SP 808 has a BSSID "AP3" and CBSSID "CBSSID3". In an embodiment, the client station 804 generally corresponds to the client station 134-1 and the first AP 802, second AP 806, and third AP 808 generally correspond to instances of the AP 114. In an embodiment, one or more of the first AP 802, the second AP 806, and the third AP 808 share neighbor information (e.g., WUR neighbor information) with each other via respective WLAN network interface devices, LAN network interface device, or other suitable communication channels.

In the example of FIG. 8, the client station 804 performs an association 820 with the first AP 802, for example, by transmitting an association request management frame to the first AP 802. The first AP 802 generates and transmits a WLAN packet 822 that includes WUR neighbor information for the second AP 806. In embodiment, for example, the first AP 802 generates the WLAN packet 500 with one of the WUR neighbor information element 550 or the WUR neighbor information sub-element 620 and transmits the WLAN packet 500 to the client station 804. In an embodiment, the first AP 802 broadcasts the WLAN packet 500 to a plurality of client stations, for example, as a WLAN beacon frame.

The client station 804 is configured to store at least some of the WUR neighbor information from the WLAN packet 500, in an embodiment. The second AP 806 generates and transmits (e.g., broadcasts) a WUR packet 824, in an embodiment. In an embodiment, for example, the WUR packet 824 generally corresponds to the WUR packet 200 or 300, but includes the CBSSID of the second AP 806 and thus acts in a similar manner to a beacon frame (e.g., a WUR beacon frame). The WUR packet 824 has a shorter length than a WLAN beacon frame and thus is more efficiently decoded by the WUR of the client station 804 (i.e., using less battery power). In an embodiment, the WUR packet 824 includes only the CBSSID of the second AP 806 within a WUR packet data portion.

In an embodiment, the client station 804 processes WUR neighbor information received from the first AP 802 (e.g., in WLAN packet 822) with the CBSSID received from the second AP 806 (e.g., in WUR packet 824) and determines whether to associate with the second AP 806. In an embodiment, for example, the client station 804 compares a received signal power level of the WUR packet 824 from the second AP 806 with a received power level of the WLAN packet 822 (or other suitable packet) from the first AP 802 and changes its association 826 to the second AP 806 when the received signal power level meets a suitable threshold. In an embodiment, the second AP 806 transmits the WUR packet 824 at a same power as WLAN packets (not shown) so that the client station 804 can more easily compare the received signal power levels.

In the example shown in FIG. 8, the client station 804 receives a WUR packet 830 from the third AP 808. In an embodiment, the WUR packet 830 generally corresponds to the WUR packet 700 and includes the CBSSID3 of the third AP 808 and primary channel information of the third AP 808. In one embodiment, the client station 804 generates and transmits a WLAN packet 832 using the CBSSID3 and primary channel information from the WUR packet 830. In an embodiment, for example, the client station 804 broadcasts a Probe Request frame, that includes the CBSSID3, on the primary channel identified by the primary channel information. The third AP 808 receives the WLAN packet 832 and responds with a WLAN packet 834, for example, a Probe Response frame that includes the BSSID3 of the third AP 808. In an embodiment, the client station 804 associates 836 with the third AP 808 using the Probe Response frame. In some embodiments and/or scenarios, one or more of the first AP 802 and the second AP 806 also receive the WLAN packet 832, but disregard the WLAN packet 832 because the CBSSID does not match their respective CBSSIDs.

In the example shown in FIG. 8, the client station 804 transmits the WLAN packet 832 to request additional connection information from the third AP 808, in an embodiment. In another embodiment, the client station 804 wakes its WLAN network interface device at a suitable time to receive a WLAN beacon frame from the third AP 808, using the time difference 708 provided in the WUR packet 830, to obtain the additional connection information.

Figure 9:
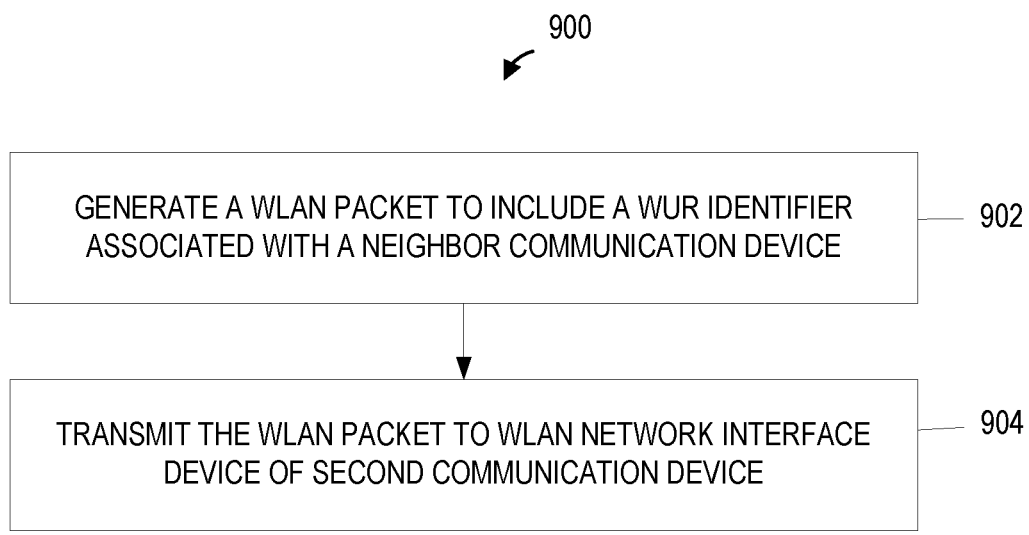
FIG. 9 is a flow diagram of an example method for transmitting a WLAN packet, according to an embodiment.

FIG. 9 is a flow diagram of an example method 900, performed by a first communication device, for transmitting a WLAN packet to a WLAN network interface device of a second communication device, according to an embodiment. In an embodiment, the second communication device includes a separate WUR coupled to the WLAN network interface device. In an embodiment, the first communication device is the AP 114 or the first AP 802 and the second communication device is the client station 134-1 or the client station 804. In other embodiments, however, the first communication device and the second communication device are other suitable communication devices. In an embodiment, the network interface device 122 of the AP 114 is configured to perform the method 900. In other embodiments, however, the method 900 is performed by another suitable communication device.

At block 902, the AP 114 generates the WLAN packet to include a WUR identifier associated with a neighbor communication device. In an embodiment, the neighbor communication device is a different instance of the AP 114. As an example, the AP 114 corresponds to the first AP 802, the neighbor communication device corresponds to the second AP 806, and the WLAN packet corresponds to the WLAN packet 822. In an embodiment, the WUR identifier is usable by the WUR of the client station 134 to identify WUR packets transmitted by the neighbor communication device and the neighbor communication device is different from the first communication device. For example, the client station 804 uses the WUR identifier (e.g., CBSSID2) from the WLAN packet 822 to identify a transmitter of the WUR packet 824.

At block 904, the AP 114 transmits the WLAN packet to the WLAN network interface device of the client station 134. In an embodiment, the WUR identifier is a compressed basic service set identifier (CBSSID). In an embodiment, the WLAN packet is generated as a management frame that includes the CBSSID, a basic service set identifier (BSSID) associated with the neighbor communication device, and primary channel information associated with the neighbor communication device. For example, the WLAN packet is a management frame that includes the CBSSID2 as the CBSSID, the AP2 as the BSSID, and suitable primary channel information associated with the second AP 806. In an embodiment, the WLAN packet is a management frame that includes a neighbor report information element that includes a WUR subelement having the WUR identifier. For example, the WLAN packet includes the neighbor report information element 600 having the WUR neighbor information sub-element 620.

In an embodiment, the method 900 also includes generating, at the AP 114, a WUR packet that includes a WUR identifier of the AP 114, and transmitting the WUR packet. For example, the first AP 802 generates an instance of the WUR packet 824 having a CBSSID with a value corresponding to CBSSID1 of the first AP 802. In an embodiment, the first AP 802 transmits the WUR packet at a same transmit power as the WLAN packet. For example, the AP 802 transmits the instance of the WUR packet 824 at a same transmit power as the WLAN packet 822.

Figure 10:
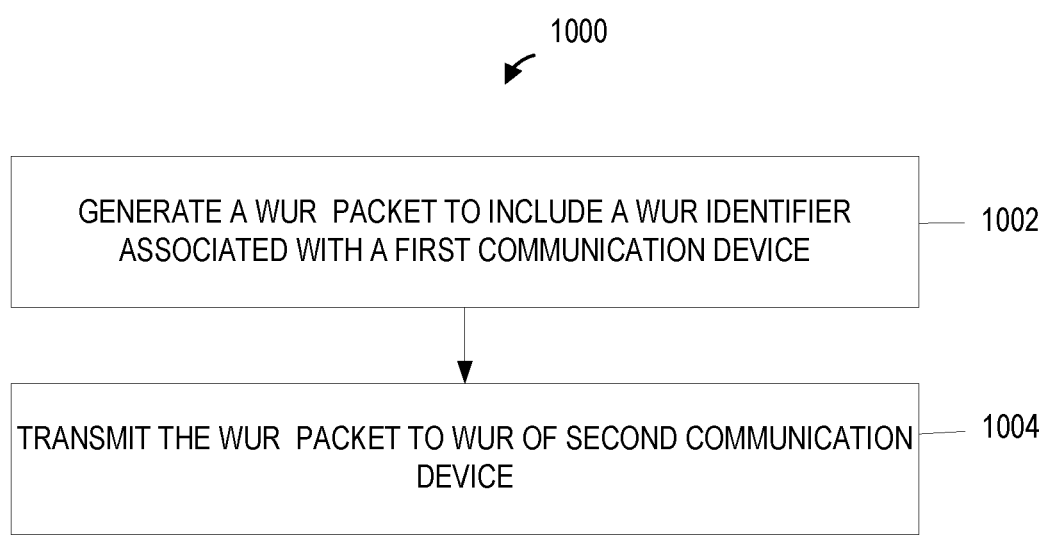
FIG. 10 is a flow diagram of an example method for transmitting a WUR packet, according to an embodiment.

FIG. 10 is a flow diagram of an example method 1000, performed by a first communication device, for transmitting a WUR packet to a WUR of a second communication device, according to an embodiment. In an embodiment, the second communication device includes a separate WLAN network interface device coupled to the WUR. In an embodiment, the first communication device is the AP 114 or the second AP 806 and the second communication device is the client station 134-1 or the client station 804. In other embodiments, however, the first communication device and the second communication device are other suitable communication devices. In an embodiment, the network interface device 122 of the AP 114 is configured to perform the method 1000. In other embodiments, however, the method 1000 is performed by another suitable communication device.

At block 1002, the second AP 806 generates the WUR packet to include a WUR identifier associated with the second AP 806. In an embodiment, the WUR packet is the WUR packet 824, for example. In an embodiment, the WUR identifier is usable by the WLAN network interface of the client station 804 to determine whether to associate with a WLAN network interface device of the second AP 806.

At block 1004, the second AP 806 transmits the WUR packet to the WUR of the client station 804. In an embodiment, the WUR identifier is a compressed basic service set identifier (CBSSID). In an embodiment, the method 1000 also includes transmitting the CBSSID, a basic service set identifier (BSSID) associated with the second AP 806, and primary channel information associated with the second AP 806 to a third communication device that transmits a WLAN packet with the CBSSID, the BSSID, and the primary channel information to the WLAN network interface device of the client station 804. For example, the second AP 806 transmits the WUR neighbor information included in the WLAN packet 822 to the first AP 802, and the first AP 802 transmits the WUR neighbor information to the client station 804 in the WLAN packet 822.

In an embodiment, the second AP 806 transmits a WLAN packet via the WLAN network interface device of the second AP 806 at a same transmit power as the WUR packet where the WLAN packet includes a management frame. In an embodiment, the WUR packet includes primary channel information associated with the second AP 806, and a basic service set identifier (BSSID) associated with the second AP 806.

Figure 11:
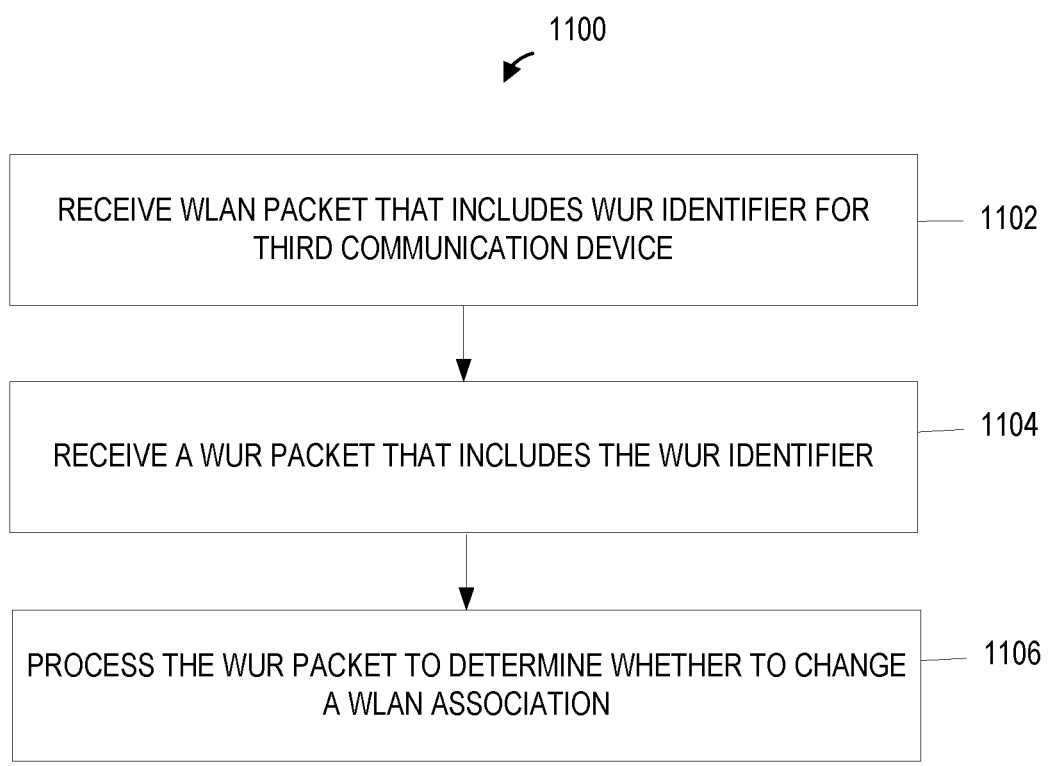
FIG. 11 is a flow diagram of an example method of processing a WLAN packet, according to an embodiment.

FIG. 11 is a flow diagram of an example method 1100, performed by a first communication device, for processing a WLAN packet received from a second communication device, according to an embodiment. In an embodiment, the first communication device includes a WLAN network interface device and a separate WUR coupled to the WLAN network interface device. In an embodiment, the first communication device is the client station 134-1 or the client station 804 and the second communication device is the AP 114 or the first AP 802. In other embodiments, however, the first communication device and the second communication device are other suitable communication devices. In an embodiment, the network interface device 142 of the AP 114 is configured to perform the method 1100. In other embodiments, however, the method 1100 is performed by another suitable communication device.

At block 1102, the client station 804 receives, at its WLAN network interface device and from the first AP 802, a WLAN packet that includes a WUR identifier for a third communication device. In an embodiment, the WLAN packet is the WLAN packet 822 and includes the CBSSID2 for the second AP 806. In an embodiment, the WUR identifier is a compressed BSSID (CBSSID).

At block 1104, the WUR of the client station 804 receives a WUR packet that includes the WUR identifier. In an embodiment, for example, the client station 804 receives the WUR packet 824 from the second AP 806.

At block 1106, the client station 804 processes the WUR packet to determine whether to change a WLAN association from the first AP 802 to the second AP 806.

In an embodiment, the WLAN packet is a management frame that includes the WUR identifier, a basic service set identifier (BSSID) associated with the second AP 806, and primary channel information associated with the second AP 806. In an embodiment, the WLAN packet is a management frame that includes a neighbor report information element that includes a WUR subelement having the WUR identifier. In an embodiment, for example, the WLAN packet generally corresponds to the WLAN packet 500 with the neighbor report information element 600 and WUR neighbor information sub-element 620.

In an embodiment, the method 1100 also includes comparing a received signal strength of the WLAN packet with a received signal strength of the WUR packet, and changing a WLAN association from the first AP 802 to the second AP 806 when a difference between a received signal strength of the WUR packet and a received signal strength of the WLAN packet meets a threshold.

Figure 12:
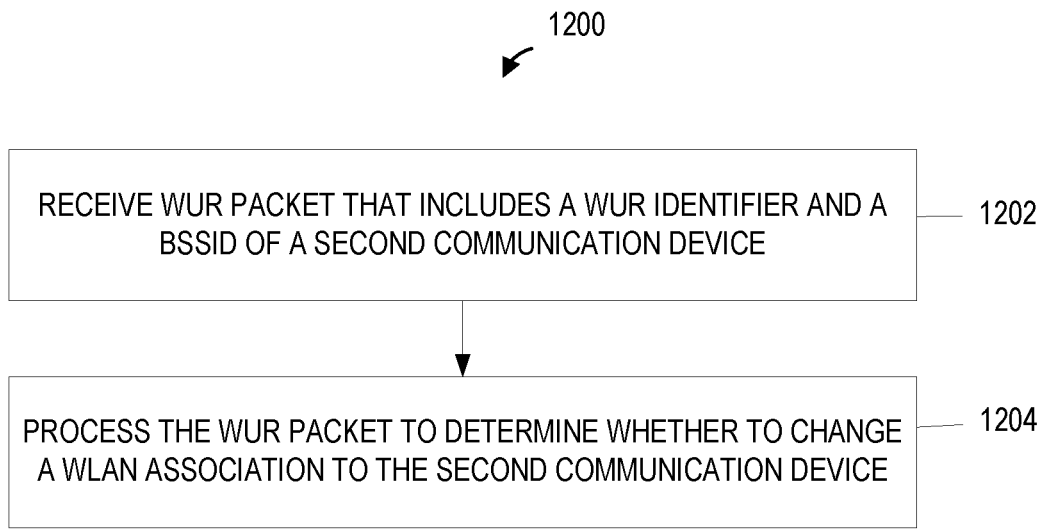
FIG. 12 is a flow diagram of an example method of processing a WUR packet, according to an embodiment.

FIG. 12 is a flow diagram of an example method 1200, performed by a first communication device, of processing a WUR packet received from a second communication device, according to an embodiment. In an embodiment, the first communication device includes a WLAN network interface device and a separate WUR coupled to the WLAN network interface device. In an embodiment, the first communication device is the client station 134-1 and the second communication device is the AP 114. In other embodiments, however, the first communication device and the second communication device are other suitable communication devices. In an embodiment, the network interface device 142 of the AP 114 is configured to perform the method 1200. In other embodiments, however, the method 1200 is performed by another suitable communication device.

At block 1202, the WUR of the client station 804 receives, from the third AP 808, a WUR packet that includes a WUR identifier for the third AP 808 and a basic service set identifier (BSSID) associated with a WLAN network interface device of the third AP 808. In an embodiment, for example, the client station 804 receives the WUR packet 830 from the third AP 806.

At block 1204, the client station 804 processes the WUR packet to determine whether to change a WLAN association to the third AP 808. In an embodiment, for example the client station 804 compares a received signal strength of a WLAN packet (not shown) with a received signal strength of the WUR packet, and changes a WLAN association from the second AP 806 to the third AP 808 when a difference between a received signal strength of the WUR packet and a received signal strength of the WLAN packet meets a roaming threshold.

In an embodiment, the WUR identifier is a compressed basic service set identifier (CBSSID).

In an embodiment, processing the WUR packet includes i) generating a probe request frame that includes the CBSSID, where the CBSSID identifies an intended recipient of the probe request frame, and transmitting the probe request frame to the third AP 808. In an embodiment, for example, the client station 804 generates the WLAN packet 832 with the CBSSID3 of the third AP 808. In an embodiment, the WUR packet includes primary channel information associated with the second communication device and transmitting the probe request frame includes transmitting the probe request frame on a primary channel having a channel class and channel number identified by the primary channel identifier.

In some embodiments and/or scenarios, the client station 134 scans through multiple WLAN channels for nearby APs, and uses a measured received signal strength for improved location services. In general, scanning on the "main" radio (e.g., the WLAN network interface device) consumes higher power than WUR. In addition, scanning on the main radio may conflict with regular data exchange. In an embodiment, the client station 134 performs a WUR-facilitated location scan, where the client station 134 scans through the channels using the WUR, and uses the signal strength measured from WUR packets received from adjacent APs to provide additional information to the location services on the client station 134. In other words, at least some of the location scans on the main radio are offloaded to the WUR, which provides for an ultra-low power location scan mechanism.

Figure 13:
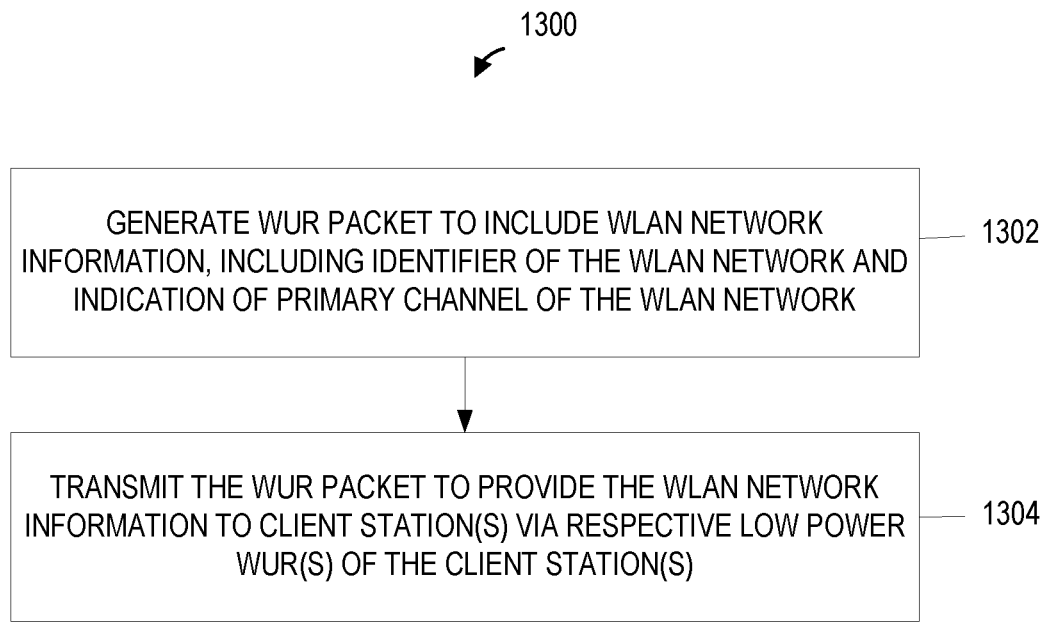
FIG. 13 is a flow diagram of an example method, performed by an AP, of communicating network information in a WLAN, according to an embodiment.

FIG. 13 is a flow diagram of an example method 1300, performed by an AP, of communicating network information in a WLAN, according to an embodiment.

At block 1302, the AP generates a WUR packet to include WLAN network information regarding a WLAN network managed by the AP, the network information including i) an identifier of the WLAN network managed by the AP, and ii) an indication of a primary channel used by the WLAN network, the primary channel from among multiple WLAN communication channels.

In an embodiment, the WUR identifier includes a CBSSID. In an embodiment, the WUR identifier includes a compressed SSID.

In an embodiment, the indication of the primary channel includes i) an indicator of an operating class that corresponds to the primary channel, and ii) a channel number that corresponds to the primary channel.

At block 1304, the AP transmits the WUR packet to provide the WLAN network information to one or more client stations via one or more respective low power WURs of the one or more client stations.

In an embodiment, the method 1300 further includes the AP transmitting a WLAN packet having a management frame, wherein the AP transmits the WLAN packet at a same transmit power that the AP used to transmit the WUR packet.

In an embodiment, the method 300 further includes: the AP receiving a first WLAN packet via the primary channel, the first WLAN packet having been transmitted by a client station that determined the primary channel using the indication of the primary channel in the WUR packet, the first WLAN packet including a probe request frame; the AP generating a probe response frame; and the AP transmitting a second WLAN packet via the primary channel in response to receiving the probe request frame, the second WLAN packet including the probe response frame.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A first communication device for communicating in a wireless local area network (WLAN), the first communication device comprising:

a WLAN network interface device configured to receive, from a second communication device, a WLAN packet that includes a first identifier of a third communication device; and a wakeup radio (WUR) coupled to the WLAN network interface device, the WUR configured to receive a WUR packet that includes a second identifier of the third communication device, the second identifier generated from the first identifier;

wherein at least one of the WLAN network interface and the WUR are further configured to use the WUR packet to determine whether to change a WLAN association from the second communication device to the third communication device.

2. The first communication device of claim 1, wherein:
the WLAN packet is a management frame that includes the first identifier, the first identifier being a basic service set identifier (BSSID) associated with the third communication device;
the second identifier is generated from the BSSID;
the WUR packet further includes primary channel information associated with the third communication devie; and
the WLAN network interface is configured to use the BSSID in the WLAN packet and the primary channel information in the WUR packet to change the WLAN association from the second communication device to the third communication device.

3. The first communication device of claim 1, wherein the WLAN packet is a management frame that includes a neighbor report information element having the first identifier.

4. The first communication device of claim 1, wherein the WLAN network interface is configured to:
compare a received signal strength of the WLAN packet with a received signal strength of the WUR packet; and
change a WLAN association from the second communication device to the third communication device when a difference between a received signal strength of the WUR packet and a received signal strength of the WLAN packet meets a threshold.

5. The first communication device of claim 1, wherein:
the first communication device corresponds to a client station;
the second communication device is a first access point (AP); and
the third communication device is a second AP.

6. The first communication device of claim 1, wherein:
the WLAN network interface device includes one or more transceivers; and
the WUR includes a receiver.

7. The first communication device of claim 6, further comprising:
a host processor coupled to the WLAN network interface device.

8. The first communication device of claim 7, further comprising:
one or more antennas coupled to the one or more transceivers and the receiver.

9. The first communication device of claim 6, further comprising:
one or more antennas coupled to the one or more transceivers and the receiver.

10. A first communication device for communicating in a wireless local area network (WLAN), the first communication device comprising:

a WLAN network interface device having circuitry configured to:
generate a WLAN packet to include a wakeup radio (WUR) identifier associated with a second communication device that neighbors the first communication device, wherein the WUR identifier is usable by a WUR of a third communication device to identify WUR packets transmitted by the second communication device, and
control the WLAN network interface device to transmit the WLAN packet to a WLAN network interface device of the third communication device.

11. The first communication device of claim 10, wherein the circuitry is configured to generate the WLAN packet to include a management frame that includes a basic service set identifier (BSSID) associated with the second communication device, and primary channel information associated with the second communication device.

12. The first communication device of claim 10, wherein the circuitry is configured to generate the WLAN packet to include a management frame having a neighbor report information element that includes a WUR subelement having the WUR identifier associated with the second communication device.

13. The first communication device of claim 10, wherein the circuitry is further configured to:
generate a WUR packet that includes a WUR identifier of the first communication device; and
control the WLAN network interface device to transmit the WUR packet.

14. The first communication device of claim 13, the circuitry is further configured to control the WLAN network interface device to transmit the WUR packet at a same transmit power as the WLAN packet.

15. The first communication device of claim 10, wherein:
the first communication device corresponds to a first access point (AP);
the second communication device is a second AP; and
the third communication device is a client station.

16. The first communication device of claim 10, wherein the WLAN network interface device includes one or more transceivers at least partially implemented with the circuitry.

17. The first communication device of claim 16, further comprising:
a host processor coupled to the WLAN network interface device.

18. The first communication device of claim 17, further comprising:
one or more antennas coupled to the one or more transceivers.

19. The first communication device of claim 16, further comprising:
one or more antennas coupled to the one or more transceivers.

20. The first communication device of claim 16, further comprising:
a host processor coupled to the WLAN network interface device.

21. A method device for communicating in a wireless local area network (WLAN), the method comprising:
receiving, at a WLAN network interface device of a first communication device, a WLAN packet from a second communication device, the WLAN packet including a first identifier of a third communication device;
receiving, at a wakeup radio (WUR) of the first communication device, a WUR packet that includes a second identifier of the third communication device, the second identifier generated from the first identifier; and using, by the first communication device, the WUR packet to determine whether to change a WLAN association from the second communication device to the third communication device.

22. The method of claim 21, wherein:

receiving the WLAN packet from the second communication device comprises receiving a management frame that includes the first identifier, the first identifier being a basic service set identifier (BSSID) associated with the third communication device;

the second identifier is generated from the BSSID;

the WUR packet further includes primary channel information associated with the third communication device; and using the WUR packet to determine whether to change the WLAN association comprises using the BSSID in the WLAN packet and the primary channel information in the WUR packet to change the WLAN association from the second communication device to the third communication device.

23. The method of claim 21, wherein the WLAN packet is a management frame that includes a neighbor report information element having the first identifier.

24. The method of claim 21, wherein using the WUR packet to determine whether to change the WLAN association comprises:

comparing, at the first communication device, a received signal strength of the WLAN packet with a received signal strength of the WUR packet; and changing, at the first communication device, a WLAN association from the second communication device to the third communication device when a difference between a received signal strength of the WUR packet and a received signal strength of the WLAN packet meets a threshold.

25. The method of claim 21, wherein:

the first communication device corresponds to a client station;

the second communication device is a first access point (AP); and the third communication device is a second AP.

* * * * *